Aug. 2, 1960

K. GEBELE 2,947,231

PHOTOGRAPHIC CAMERA PROVIDED WITH
INTERCHANGEABLE SHUTTER HAVING
INTERCHANGEABLE LENS
Filed Sept. 26, 1955

United States Patent Office 2,947,231
Patented Aug. 2, 1960

2,947,231

PHOTOGRAPHIC CAMERA PROVIDED WITH INTERCHANGEABLE SHUTTER HAVING INTERCHANGEABLE LENS

Kurt Gebele, Munich, Germany, assignor, by mesne assignments, to Compur-Werk Friedrich Deckel OHG, Munich, Germany, a German firm Filed Sept. 26, 1955, Ser. No. 536,584

Claims priority, application Germany Oct. 8, 1954

1 Claim. (Cl. 95—11)

This invention relates to a photographic camera provided with an interchangeable shutter and also having an interchangeable lens.

An object of the invention is the provision of a generally improved and more satisfactory construction of this kind.

Another object is the provision of a camera so designed and constructed that the same shutter may be used with various different lenses, and the same lens may be used with various different shutters, and both the lens and the shutter may be changed when desired.

Still another object is the provision of such a construction which embodies an adjustable diaphragm in the lens mount or assembly rather than in the shutter assembly, and in which there is simple and effective means for coupling the diaphragm adjusting member of the lens assembly to the shutter speed adjusting member of the shutter assembly, for conjoint movement, notwithstanding the separate interchangeability of both the lens assembly and the shutter assembly.

These and other desirable objects may be attained in the manner disclosed as an illustrative embodiment of the invention in the following description and in the accompanying drawings forming a part hereof, in which:

Fig. 5 is a radial section on a larger scale, of part of the construction shown in Figs. 3 and 4.

The same reference numerals throughout the several views indicate the same parts.

Figure 1:
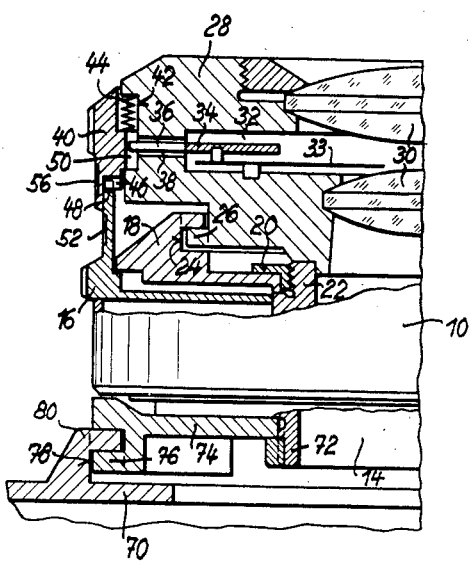
Fig. 1 is a fragmentary axial section taken radially through a portion of the lens assembly and shutter assembly and a part of the camera body, in accordance with a first embodiment of the invention.
Figure 2:
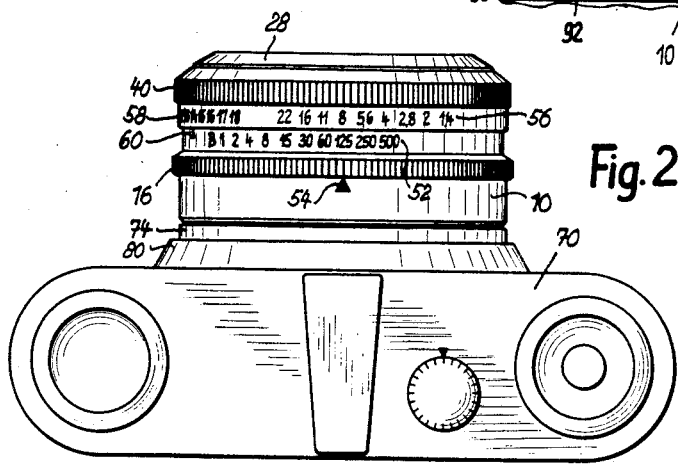
Fig. 2 is a top plan view of a camera equipped with the first embodiment of the invention.

Referring first to the embodiment shown in Figs. 1 and 2, the shutter assembly includes a main body in the form of the usual annular casing 10 having movable shutter blades which, in known manner, open and close the optical aperture or lens aperture 14. The details of construction of the blades and the mechanism for operating them are not important for purposes of the present invention, and any suitable construction may be used.

The various shutter speeds are set or adjusted by turning a shutter speed setting ring 16 arranged near the front of the shutter casing 10 and held in place by a front plate member 18 fastened by means of a threaded ring 20 to the front lens tube 22 of the shutter. In this first embodiment of the invention, the shutter speed setting member 16 is formed with an annular flange or tubular portion which extends a substantial distance forwardly from the outer edge of the radial portion of the ring 16, as plainly seen in Fig. 1, this tubular portion of the ring surrounding the outer edge of the front plate 18 and projecting forwardly beyond it.

In a thickened portion of the front plate 18, there are bayonet slots 24 of conventional kind as commonly used on bayonet mountings in the photographic field, which mate with bayonet lugs or projections 26 of the lens mount assembly indicated in general at 28. At least some of the lens elements or components 30 are mounted in the lens mount assembly 28, although some of the lens elements or components may be placed in the shutter assembly, depending on circumstances and upon the optical effects desired. By turning the lens mount assembly 28 relative to the shutter assembly 10, the bayonet lugs 26 may be disengaged from the bayonet slots 24, so that the lens mount assembly may then be removed axially from the shutter assembly, and another lens mount assembly may be substituted.

In the hollow space 32 within the lens mount assembly there is an adjustable iris diaphragm of known construction, including several diaphragm leaves 33 mounted for pivotal movement to vary the diaphragm aperture or stop size. The setting of the diaphragm leaves to the desired aperture is effected by means of a diaphragm setting ring 34 rotatably mounted in the lens assembly and having a radial arm 36 which extends outwardly through an arcuate slot 38 to engage with an externally accessible diaphragm setting ring 40 rotatable on the outer periphery of the casing or housing of the lens mount assembly 28, and also guided for limited axial movement along a portion 42 of the lens mount assembly. Several small compression springs 44, arranged at appropriate intervals around the periphery of the ring 40, constantly tend to move the ring axially rearwardly to its rearmost limit of movement, but permit it to be moved forwardly by manual force sufficient to overcome the springs.

At the rear edge of the ring 40 is a coupling tooth 46 adapted to seat selectively in one or another of a series of coupling notches 48 formed in the forward end of the shutter speed setting ring 16 previously mentioned. The springs 44 thus tend to keep the coupling tooth 46 in any one of the notches 48 in which it is already seated, thereby coupling the ring 40 to the member 16 in a definite position relative to each other, but when the ring 40 is moved forwardly against the force of the springs 44, to bring the tooth 46 out of one of the notches 48, the ring 34 may then be turned to change the relative orientation of these members. The inner face of the ring 40 has an axial slot 50 which closely receives the projecting radial arm 36 of the diaphragm setting ring 34, so that the member 40 is always coupled to the ring 34 to turn therewith, regardless of the axial movements of the ring 40 in coupling it to or uncoupling it from the shutter speed setting member 16.

The preferred arrangement of the various setting scales can best be seen in Fig. 2. The shutter speed setting ring 16 bears a shutter speed scale 52 read in conjunction with a stationary index mark or main pointer 54 placed on a suitable stationary part of the shutter casing 10. The diaphragm adjusting ring or coupling ring 40 carries a diaphragm aperture scale 56, also read in conjunction with the same stationary index mark 54. On the same ring 40 but displaced circumferentially from the scale 56, is a scale 58 graduated in exposure values and read in conjunction with a reference mark or pointer 60 marked on the ring 16, to indicate the relative positions of orientation of the members 16 and 40 with respect to each other, independently of the absolute position of either one of them.

The shutter assembly itself, according to the present invention, is not rigidly or permanently attached to the camera body, indicated in general at 70, but rather is detachable and removable therefrom, so that it may be replaced by a different shutter assembly having different characteristics. For this purpose, the rear lens tube 72 of the shutter is provided with a bayonet connection plate 74 carrying bayonet projections or lugs 76 which mate in the known manner with bayonet slots 78 on the bayonet ring 80 mounted on the front wall of the camera 70. Thus by turning the shutter assembly relative to the camera body, the bayonet connection may be disengaged and the entire shutter may be bodily removed quickly from the camera body, to be replaced by a different shutter having different characteristics.

It will be noted that the parts 22 and 72 of the shutter assembly have been referred to as the front and rear lens tubes, respectively, which is in accordance with customary shutter nomenclature. This does not necessarily imply, however, that lens elements or components are actually mounted in these tubes 22 and 72. Depending upon the optical results desired, all of the lens components may be mounted in the lens assembly 28, or some of the lens components may be mounted in the lens assembly 28 and some of them may be mounted in one or both of the tubes 22 and 72.

In the preferred form, the shutter is actuated (that is, tensioned or cocked ready for an exposure, and released or tripped to make an exposure) from control mechanism on the camera body itself, the operative connection from the moving parts in the shutter assembly and the moving parts on the camera body being such that it will not interfere with removal and replacement of the shutter. The details of such connection are not important for purposes of the present invention, but the connection may be made, for example, in one or another of the forms disclosed in the copending United States patent application of Kurt Gebele, Serial No. 514,218, filed June 9, 1955, issued on August 25, 1959, as Patent 2,900,885. The shutter preferably includes an operating member such as a rotatable shaft which protrudes from the rear of the shutter assembly and engages suitable operating parts on the camera body, in the manner shown in said copending application, when the shutter is attached to the camera body.

It may be mentioned also that each of the bayonet connections (that is, the bayonet connection between the shutter assembly and the camera body, and the bayonet connection between the lens mount assembly and the shutter assembly) is provided with a suitable latch or lock of a form known per se, so that when one of the bayonet connections is disconnected, the other will not become accidentally loosened at the same time.

From the foregoing, it is seen that this invention relates to a camera in which both the shutter assembly and the lens mount assembly are detachably connected to the camera body and also detachably connected to each other, by connections which are very simple and which may be easily and quickly operated to disconnect the parts and replace them with other parts having different characteristics. In this way, it is possible to obtain many optical variations. Thus the shutter assembly may be left in place on the camera body and the lens mount assembly may be changed to use lenses of different characteristics. Or again, the shutter assembly may be taken off and replaced by a different shutter assembly having a different axial length, a different aperture, or other desired different characteristics, and the same lens assembly originally used may be employed with this different or second shutter assembly. Or again, a different lens assembly may be used with different shutter assemblies. Thus by providing two different shutter assemblies and two different lens mount assemblies, four different combinations with different optical characteristics are possible. If a third lens mount assembly is added, six optically different combinations are possible.

Figure 3:
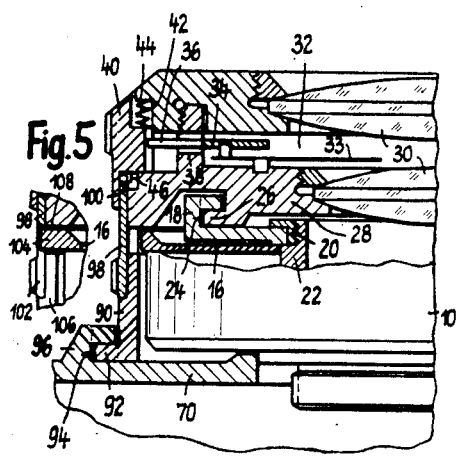
Fig. 3 is a view similar to Fig. 1 showing a second embodiment of the invention.
Figure 4:
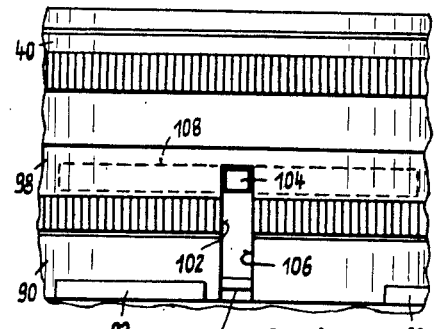
Fig. 4 is a fragmentary side elevational view of the construction shown in Fig. 3.

Another embodiment of the invention will now be described, with reference to Figs. 3, 4, and 5 of the drawings. In the first embodiment, it was the shutter assembly which was detachably connected direct to the camera body, and the lens mount assembly was supported only through and from the shutter assembly. In the second embodiment of the invention, now to be described, it is the lens mount assembly which is detachably connected directly to and is directly supported from the camera body, and the shutter assembly in turn is detachably supported from and through the lens mount assembly.

In this second embodiment, the detachable connection between the shutter assembly and the lens mount assembly is substantially the same as before, and corresponding parts are given the same reference numerals, so that no further description seems necessary. However, the detachable bayonet connection between the shutter assembly and the camera body is omitted in this second embodiment. In place of it, there is a direct bayonet mounting connection between the lens mount assembly and the camera body, formed by a cylindrical tube 90 integral with or securely fixed to the rear portion of the lens mount assembly and projecting rearwardly therefrom, this tubular portion 90 having sufficient internal diameter to surround or encompass the shutter assembly. The rear edge of this tube 90 is formed with bayonet projections or lugs 92 which mate with bayonet slots 94 in the bayonet ring 96 formed on or attached to the front wall 70 of the camera, in a manner similar to the previously described bayonet lugs 76, bayonet slots 78, and bayonet ring 80. Thus the lens mount assembly is directly attached to the camera body, and it encompasses or embraces the shutter assembly, so that the lens mount assembly must first be removed from the camera body (carrying the shutter assembly bodily with it) before the shutter assembly becomes accessible to remove it from the rear of the lens mount assembly.

To enable the coupling of the shutter speed setting member with the diaphragm aperture setting member, the following arrangement is provided. The coupling ring 40 and its springs 44 and longitudinal or axial slots 50 are the same as before. A speed setting ring 98 is rotatable on the rear portion of the lens mount assembly, behind the ring 40, and has a series of coupling notches 100 at its forward edge, in any one of which notches the coupling tooth 46 of the ring 40 may be selectively seated, in a manner similar to the first embodiment. This setting ring 98 also has an axially extending slot 102 which receives a radially projecting arm 104 on the shutter speed setting ring 16. Thus the rotary motion of the external speed setting ring 98 is transmitted to the internal speed setting ring 16.

The tubular portion 90 of the lens mount assembly is provided with an arcuate or circumferentially extending slot 108 in the transverse plane of the arm 104 and ring 16, to allow freedom of necessary rotary movement of these parts through the full range of adjusting movement. Also, to permit the shutter assembly to be withdrawn axially from the lens mount assembly (after the lens mount assembly has been removed from the camera) the tubular portion 90 of the lens mount assembly is also provided with an axial slot 106 intersecting the arcuate slot 108. When the two assemblies are to be disconnected from each other, the shutter speed is adjusted to the point where the arm 104 is in alinement with the axial slot 106, and then the two assemblies can be separated from each other in an axial direction (after turning the bayonet connection to the disconnect position, of course).

When the two assemblies are connected to each other in normal position, the diaphragm setting members 34, 40 are coupled to the shutter speed setting members 16, 98, just as was the case in the preceding embodiment, so that when one is turned, the other will turn with it normally. However, if it is desired to change the relative orientation of the shutter speed setting to the diaphragm aperture setting, this is done, as before, by moving the ring 40 forwardly against the force of the springs 44, and then turning it so as to seat the coupling tooth 46 in a different one of the notches 100.

The arrangement of the scales is quite similar to that described in connection with the first embodiment. The diaphragm aperture scale 56 and the exposure value scale 58 are both placed on the ring 40, just as before. The shutter speed scale 52 and the index mark 60 are placed on the ring 98. The main stationary pointer or index mark 54 is placed on the tube 90.

In the embodiments above specifically described, the adjustable diaphragm is placed in the lens mount assembly rather than in the shutter assembly. However, certain features of the invention may still be used even if the adjustable diaphragm is built directly into the shutter assembly in a manner which is quite familiar in the photographic field, instead of being placed separately in the lens mount assembly. Also, it will be understood that although it is preferred normally to place the shutter assembly between the camera body and the lens mount assembly, yet it is within the teaching of the invention to reverse this arrangement and place the shutter assembly in front, with the detachable lens mount assembly between it and the camera body.

Certain subject matter disclosed but not claimed herein is claimed in the copending United States patent application of Kurt Gebele, Serial No. 512,189, filed May 31, 1955, now Patent 2,889,761, issued June 9, 1959.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claim.

What is claimed is:

A photographic camera construction including a camera body, a shutter unit, and a lens unit separate from said shutter unit, said camera body, shutter unit, and lens unit each having an optical axis alined with the optical axes of the others, characterized by the provision of interengaging bayonet connection parts on said shutter unit and said lens unit for detachably connecting said two units to each other by relative rotary movement of less than one complete revolution about the optical axes of said units as a center, and other interengaging bayonet connection parts on one of said units and on said camera body for detachably connecting said one of said units to said body by relative rotary movement of less than one complete revolution about the optical axes as a center, whereby the camera body may be used with any selected one of a plurality of interchangeable shutter units in combination with any selected one of a plurality of interchangeable lens units.

References Cited in the file of this patent

UNITED STATES PATENTS

| | | |
|---|---|---|
| 2,190,729 | Nerwin | Feb. 20, 1940 |
| 2,472,586 | Harvey | June 7, 1949 |
| 2,596,328 | Dorsey | May 13, 1952 |
| 2,649,024 | Goldhammer | Aug. 18, 1953 |
| 2,716,930 | Marson | Sept. 6, 1955 |
| 2,887,940 | Gebele | May 26, 1959 |

FOREIGN PATENTS

| | | |
|---|---|---|
| 278,561 | Germany | Sept. 30, 1914 |
| 303,088 | Germany | Jan. 18, 1918 |
| 1,086,169 | France | Aug. 4, 1954 |
| 1,095,630 | France | Dec. 22, 1954 |